United States Patent [19]

Akutsu

[11] Patent Number: 4,510,511
[45] Date of Patent: Apr. 9, 1985

[54] PICTURE RECORDING METHOD AND APPARATUS

[76] Inventor: Makoto Akutsu, Saiwai-cho 7-10, Kuroiso-shi, Tochigi-ken, Japan

[21] Appl. No.: 539,609

[22] Filed: Oct. 6, 1983

[30] Foreign Application Priority Data

Oct. 6, 1982 [JP] Japan .................. 57-175752

[51] Int. Cl.³ .................. G01D 15/18; B41L 13/08
[52] U.S. Cl. .................. 346/140 R; 346/1.1; 101/122
[58] Field of Search .................. 101/122, 170; 346/1, 346/140 PD

[56] References Cited

U.S. PATENT DOCUMENTS

| | | | |
|---|---|---|---|
| 3,834,301 | 9/1974 | Croquelois et al. | 101/122 X |
| 3,884,684 | 5/1975 | Ohno et al. | 101/170 X |
| 4,047,185 | 9/1977 | Phillips et al. | 346/140 PD |
| 4,164,746 | 8/1979 | Anselrode | 346/140 PD |
| 4,368,669 | 1/1983 | Love | 346/140 PD X |
| 4,383,265 | 5/1983 | Kohashi | 346/140 PD |
| 4,396,925 | 8/1983 | Kohashi | 346/140 PD |

Primary Examiner—George H. Miller, Jr.
Attorney, Agent, or Firm—Cushman, Darby & Cushman

[57] ABSTRACT

A picture recording method and apparatus comprising a gravure roll disposed with on the surface thereof a plurality of micro recesses to keep an ink containing an evaporable coloring matter therein, a platen roll arranged parallel and adjacent to the gravure roll, a recording medium so partially wound on the platen roll as to be fed by the platen roll, discharge electrodes arranged parallel to the gravure roll between the gravure roll and platen roll to evaporate the ink kept within the micro recesses and to adhere it by making it fly to the recording medium and a high voltage generating unit to apply a high voltage on the discharge electrodes in correspondence to a picture signal, in order to enable to record a clear picture on the recording medium with high speed.

8 Claims, 3 Drawing Figures

PICTURE RECORDING METHOD AND APPARATUS

BACKGROUND OF THE INVENTION

1. Field of the Invention

The present invention relates to a novel picture recording method and apparatus using an ink containing an evaporable coloring matter.

2. Description of the Prior Art

Conventionally, as a picture recording method using a pigment, such a method wherein, for example, the picture recording is effected by pressing a thermal head on the back of the ink ribbon applied with a pigment ink being put on the recording medium, resolving the ink binder by effecting a quick heating and adhering said ink on the recording medium is known. However, this method had such defects as to increase the running cost of the picture recording apparatus because the coloring matter utilizing ratio is so extremely low as to be 1% for the use of ink ribbon and as to be unable to use as a high speed apparatus because a heat diffusion is caused to deteriorate the picture resolution and the recording requires a comparatively long time for the use of the thermal head.

SUMMARY OF THE INVENTION

The primary object of the present invention is, in view of the above-mentioned circumstances, to provide a picture recording method enabled to record a picture on a recording medium without using an ink ribbon and an apparatus to practice the method.

According to the present invention, this object is attained by supplying an ink containing an evaporable coloring matter to an ink transporting means, cooling the ink below the melting point of the ink bonding agent and applying a discharge energy controlled in accordance to the picture information to the ink on the ink transporting means brought to a given position in order to evaporate the evaporable coloring matter of the ink and to make the coloring matter fly to the recording medium opposedly disposed near the ink transporting means and, thereby, to form a picture on the recording medium.

According to the preferable formation of the present invention, the picture recording apparatus comprises an ink transporting means having on its surface a plurality of micro recesses formed with a conductive bottom face and electrically insulating partition walls, an ink container arranged adjacent to the ink transporting means and having a heating means to fill up the micro recesses of the ink transporting means with an ink containing an evaporable coloring matter being in a fused status, a plurality of discharge electrodes arranged to the width direction of the ink transporting means near the ink transporting means at the position far from the ink container, a high voltage generating unit connected to the discharge electrodes and able to supply a pulse high voltage controlled in accordance to the picture information to the discharge electrodes and a recording medium feeding means arranged near the ink transporting means and able to feed the recording medium in facing to the ink transporting means. When a high voltage is applied to the discharge electrodes and a discharge is effected between the discharge electrodes and the micro recesses in order to form a picture on the recording medium, the evaporable coloring matter within the micro recesses is evaporated by the discharging energy, made to fly to the recording medium, made to adhere on the recording medium and made to diffuse.

The ink transporting means and recording medium feeding means are able to be so formed as to be a pair of rolls disposed parallel to each other and a bias voltage is applied between the ink transporting means and recording medium feeding means in order to promote the adhesion of the evaporated coloring matter onto the recording medium. A cooling means to cool the ink filled up within the micro recesses and a doctor blade to delete the ink adhered on the outer surfaces of the partition walls of the micro recesses are provided between the ink container and the discharge electrodes.

Another object of the present invention is to provide a picture recording apparatus able to record a clear picture of high resolution.

A still another object of the present invention is to provide a picture recording apparatus able to effect a high speed recording with a simple formation.

DESCRIPTION OF THE PREFERRED EMBODIMENT

Figure 1:
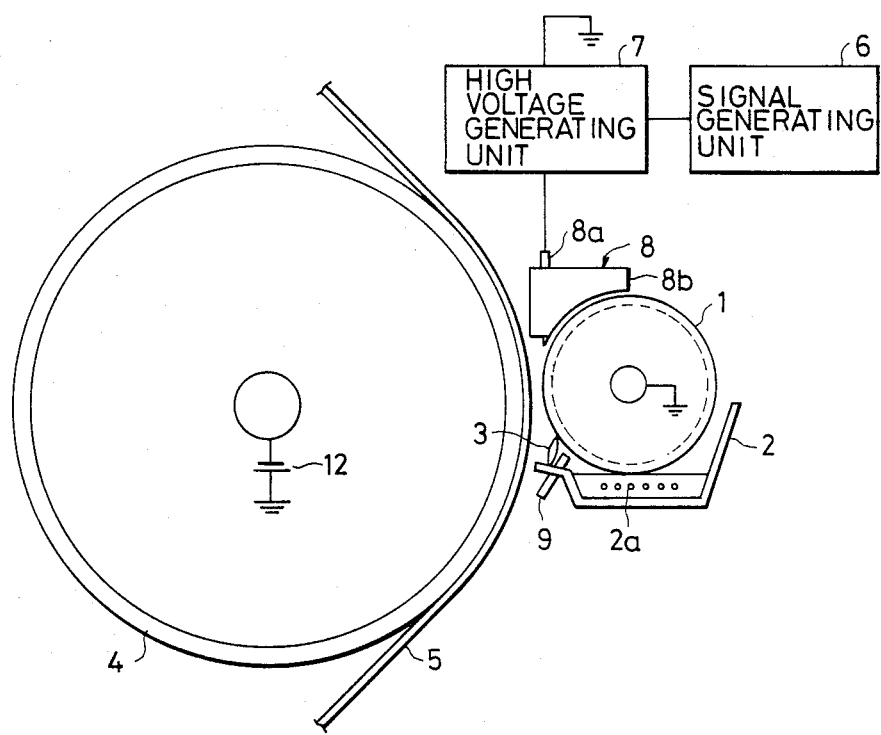
FIG. 1 is a schematic side view showing an embodiment of the picture recording apparatus according to the present invention.

The reference numeral 1 is a gravure roll disposed with micro recesses on its surface all over the roll and used as an ink transporting means to successively supply a given amount of ink to the discharge area, 2 is an ink container provided with a heater 2a to fuse the ink containing an evaporable coloring matter and to keep it in a given temperature and storing a given amount of ink to supply the ink within recesses on the surface of the gravure roll 1, 3 is a doctor blade to delete the superfluous ink adhered on the surface of the gravure roll 1 and to form an ink layer of the gravure roll, 4 is a platen roll of which the surface is covered with a silicone rubber, fluorine-contained rubber or the like, 5 is a recording medium such as a paper or the like, 6 is a signal generating unit to generate a picture signal of the original picture transfigured into dots in the XY direction as a pulse signal, 7 is a high voltage generating unit to generate a high voltage in correspondence to the pulse signal and 8 is discharge electrodes of which only a plurality of electrode needles 8a are arranged in an exposed status with a given interval along the axis direction of the gravure roll in correspondence to the gravure roll 1 and the remaining portions are laid within insulators 8b so disposed as to cover a part of the gravure roll. The ink fused by the heater 2a to be in a fluid status within the ink container 2 is supplied within the micro recesses on the gravure roll 1, evened by the doctor blade 3 in consequence to the rotation of the gravure roll 1 and transported to the discharge area after being cooled below the melting point of the bonding agent of the ink during the transportation to the discharge area by a cooling means 9 consisting of a blower and the like. Within a discharge area, the gravure roll 1 and the platen roll 4 are so separated with a certain interval that the ink will not be directly transported on the recording medium 5 and the tip ends of the discharging electrode needles 8a are arranged near the most approximating point of the gravure roll 1 and platen roll 4. When the original picture is transfigured into dots and input into a high voltage generating unit 7 as a pulse signal by the signal generating unit 6, a high voltage corresponding to the pulse signal is applied to the electrode needles 8a of the respective discharge electrodes 8 from the high voltage generating unit 7, a discharge is generated between said electrode needles 8a and a discharge electrode layer 1b of the gravure roll 1, the ink 10 within the micro recesses interposing between the electrodes 8a and discharge electrode layer 1b of the gravure roll 1 is evaporated by the heat energy generated by the discharge to be a vapor 11, made to fly to the direction of the recording medium 5 being fed through the platen roll 4, made to adhere on the recording medium 5 and made to diffuse and, thereby, a picture in accordance to the picture information is formed on the recording medium 5. As the gravure roll 1 is rotated to a given direction in a prescribed velocity, the recesses which are empty of ink are again filled up with ink from the ink container 2 and the ink layer even over the whole surface of the gravure roll 1 is again transported to the discharge area. It is thereby able to successively form a picture without wasting ink.

The ink is formed with an evaporable coloring matter, a bonding agent and a pigment which is added according to a necessity. The evaporable coloring matter is an organic coloring matter of comparatively small molecular weight and is contained in a large amount in a well-known conventional disperse dye, which is able to be classified from its chemical structure into an azo-group, anthraquinone-group, stilbene-group and nitrodiphenyl-group. By the way, an ink containing a carbon may be used when a black monochromatic picture is desired.

Figure 2:
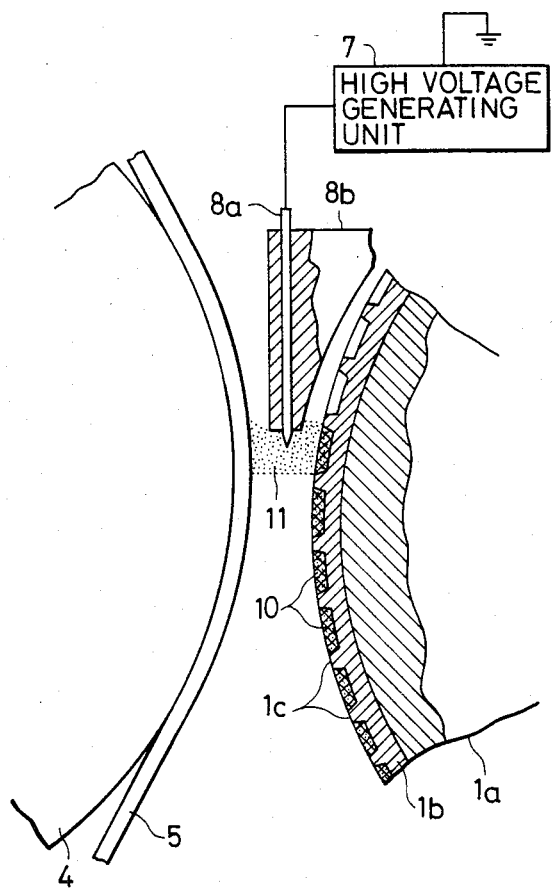
FIG. 2 is a partially enlarged view of FIG. 1 broken in part.
Figure 3:
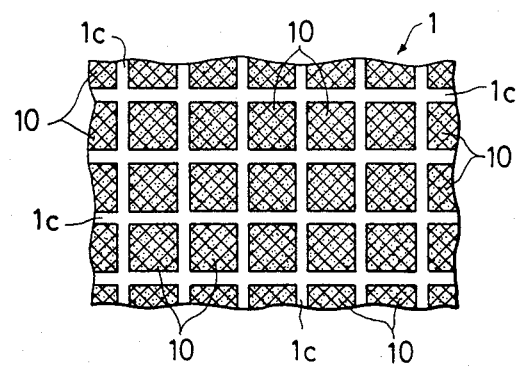
FIG. 3 is a partially enlarged view of the surface of the ink transporting means.

As clearly shown in FIG. 2, the gravure roll 1 is formed with a roll base member 1a consisting of Al, Fe, a stainless steel or the like, the discharge electrode layer 1b consisting of such a metal of high melting point at Ti, Ta, W, Pt, Au or the like and to effect a discharge between the electrode needles 8a and partition walls 1c made of such a material of high electric insulation as an electrically insulating ceramics or an Alumirite and to form micro recesses. The discharge electrodes 8 are formed with the electrode needles 8a and the insulating portions 8b and are insulated each other. When a pulse-like high voltage is applied to the discharge electrodes 8 from the high voltage generating unit 7, a discharge occurs between the electrode needles 8a and the discharge electrode layer 1b of the gravure roll 1 and an energy necessary to evaporate the ink flows into the discharge electrode layer 1b through the ink layer from the electrode needles 8. In the meantime, the whole ink within the corresponding recesses becomes into an explosive evaporative status by receiving the discharge energy, flys to the direction of the recording medium and the evaporated ink adheres on the recording medium and diffuses to form a dot-like picture. The energy necessary to evaporate the ink is decided by the boiling point of the evaporable coloring matter, the amount of bonding agent and the like and it is able to obtain a sufficiently clear picture with such a degree of energy as of 9.1 J/cm$^2$. The resolution of the picture obtainable on the recording medium 5 is decided by the number of electrode needles 8a per unit length, a pulse length and the number of recesses on the gravure roll 1 per unit area. It was able to obtain a sharp picture of high resolution when the electrode needles 8a are arranged in the proportion of 20/mm and the recesses are arranged in the proportion of 60/mm. The picture density on the recording medium 5 is decided by controlling the number of pulse per unit area. The picture density will be high when the number of discharge pulse per unit area is increased and will be low when the number of pulse is decreased. In this mode, it is able to easily reappear the tone of the original picture on the recording medium 5. The area wherein the ink is evaporated by the discharge energy is substantially decided by the largeness of the electrode needle 8a and the pulse width. Accordingly, comparing to the method to transfer the ink with the thermal head, the diffusion of energy is small and a picture of high resolution is obtainable. At the same time, the energy efficiency becomes high. To obtain a more sharp picture, it is enough to apply a bias voltage between the gravure roll 1 and the platen roll 4 by, for example, a direct current source 12 or the like. When a voltage of the polarity contrary to the polarity of the voltage to be applied to the discharge electrodes 8 is added between the platen roll 4 and the gravure roll 1, as the coloring matter evaporation evaporated by the discharge is electrified in the polarity of the voltage to be applied to the discharge electrodes 8, the coloring matter evaporation receives an electrostatic attraction to control the diffusion of the evaporation and it is able to obtain a still shaper picture.

By the way, in case the ink container 2 is exchanged, when the gravure roll 1 is given a full rotation, with an ink container containing an ink which does not react on the ink used theretofore, that is, a hydrophilic ink in the case of a lipophilic ink and the discharge energy supply is shut off, the present apparatus may be used as a handy printer as it stands. And, in case such an ink as to solidify by, for example, the ultraviolet ray radiation is used, the gravure roll 1 may be used for a long time as a printing negative plate by solidifying the ink remaining within each recess of the fully rotated gravure roll.

I claim:

1. A picture recording method comprising a step for supplying an ink containing an evaporable coloring matter to an ink transporting means, a step for cooling said ink below the melting point of the bonding agent of said ink, and a step for applying a discharge energy controlled by the picture information to the ink on said ink transporting means brought to a predetermined position in order to evaporate the evaporable coloring matter of the ink and in order to fly said coloring matter to a recording medium opposedly disposed near said ink transporting means and in order to thereby form a picture on said recording medium.

2. A picture recording method according to claim 1 further comprising a step for applying a bias voltage to promote the adhesion of the evaporated coloring matter onto said recording medium between said ink transporting means and recording medium.

3. A picture recording apparatus comprising an ink transporting means having on its surface a plurality of micro recesses formed with a conductive bottom face and electrically insulating partition walls, an ink container disposed adjacent to said ink transporting means and having a heating means in order to fill up the micro recesses of said ink transporting means with an ink containing an evaporable coloring matter being in a fused status, a plurality of discharge electrodes arranged in the width direction of said ink transporting means near said ink transporting means at the position far from said ink container, a high voltage generating unit connected to said discharge electrodes and able to supply a pulse high voltage controlled by a picture information to said discharge electrodes, and a recording medium feeding means disposed near said ink transporting means and able to feed the recording medium in facing to said ink transporting means, the evaporable coloring matter within said micro recesses being evaporated by a discharge energy and being flown to said recording medium to adhere and diffuse on said recording medium when a high voltage is applied to said discharge electrodes and a discharge is effected between said discharge electrodes and the bottom of said micro recesses in order to form a picture on said recording medium.

4. A picture recording apparatus according to claim 3 wherein said ink transporting means and said recording medium feeding means are formed as a pair of rolls disposed parallel to each other.

5. A picture recording apparatus according to claim 3 wherein a bias voltage is applied between said ink transporting means and said recording medium feeding means in order to promote the adhesion of the evaporated coloring matter on said recording medium.

6. A picture recording apparatus according to claim 3 further comprising a cooling means disposed near said ink transporting means between said ink container and said discharge electrodes in order to cool the ink filled in said micro recesses below the melting point of the bonding agent of said ink.

7. A picture recording apparatus according to claim 3 further comprising a doctor blade so disposed as to contact with the surface of said ink transporting means between said ink container and said discharge electrodes in order to delete the ink adhered on the outer surface of the partition walls of said micro recesses.

8. A picture recording apparatus according to claim 3 wherein said discharge electrodes are provided in the proportion of 20/mm and said micro recesses are provided in the proportion of 60/mm.

* * * * *